United States Patent
Stryker et al.

(10) Patent No.: US 10,310,602 B2
(45) Date of Patent: Jun. 4, 2019

(54) CONTROLLED GYROSCOPIC TORQUE FOR AN ELECTRONIC DEVICE

(71) Applicant: Apple Inc., Cupertino, CA (US)

(72) Inventors: James A. Stryker, Cupertino, CA (US); Shikhar Shrestha, Cupertino, CA (US); Tommaso P. Rivellini, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 640 days.

(21) Appl. No.: 14/796,697

(22) Filed: Jul. 10, 2015

(65) Prior Publication Data

US 2016/0018223 A1 Jan. 21, 2016

Related U.S. Application Data

(60) Provisional application No. 62/023,274, filed on Jul. 11, 2014, provisional application No. 62/151,277, filed on Apr. 22, 2015.

(51) Int. Cl.
*G06F 3/01* (2006.01)
*G06F 1/16* (2006.01)
*G06F 3/0346* (2013.01)

(52) U.S. Cl.
CPC .......... *G06F 3/016* (2013.01); *G06F 1/1626* (2013.01); *G06F 1/1684* (2013.01); *G06F 1/1694* (2013.01); *G06F 3/0346* (2013.01); *G06F 2203/013* (2013.01)

(58) Field of Classification Search
CPC ...... G06F 3/016; G06F 1/1626; G06F 1/1684; G06F 1/1694; G06F 3/0346; G06F 2203/013
See application file for complete search history.

(56) References Cited

U.S. PATENT DOCUMENTS

| | | |
|---|---|---|
| 3,606,296 A | 9/1971 | Chassagne |
| 4,278,726 A | 7/1981 | Wieme |
| 4,849,580 A | 7/1989 | Reuter |
| 5,182,158 A | 1/1993 | Schaeffer |
| 5,349,893 A | 9/1994 | Dunn |
| 5,368,914 A | 11/1994 | Barrett |
| 5,426,562 A | 6/1995 | Morehouse et al. |
| 5,587,854 A | 12/1996 | Sato et al. |
| 5,606,341 A | 2/1997 | Aguilera |
| 5,659,376 A | 8/1997 | Uehara et al. |
| 5,666,261 A | 9/1997 | Aguilera |
| 5,783,297 A | 7/1998 | Wise et al. |
| 5,936,600 A | 8/1999 | Ohashi et al. |

(Continued)

FOREIGN PATENT DOCUMENTS

| | | |
|---|---|---|
| CN | 202444711 | 9/2012 |
| CN | 203119975 | 8/2013 |

(Continued)

*Primary Examiner* — Zakaria Elahmadi
(74) *Attorney, Agent, or Firm* — Brownstein Hyatt Farber Schreck, LLP

(57) ABSTRACT

A mobile electronic device can include one or more gyroscopes that each produces a controlled gyroscopic torque. An event is detected by the mobile electronic device. Characteristics of gyroscopic torque to be transmitted to the mobile electronic device may be determined. The spatial orientation of the mobile electronic device is altered by generating gyroscopic torque or torques with the gyroscope.

21 Claims, 13 Drawing Sheets

(56) References Cited

U.S. PATENT DOCUMENTS

| | | | |
|---|---|---|---|
| 5,965,249 | A | 10/1999 | Sutton et al. |
| 5,982,617 | A | 11/1999 | Haley et al. |
| 6,085,878 | A | 7/2000 | Araki et al. |
| 6,154,360 | A | 11/2000 | Kaczeus et al. |
| 6,251,493 | B1 | 6/2001 | Johnson et al. |
| 6,262,888 | B1 | 7/2001 | Siedow et al. |
| 6,288,489 | B1 | 9/2001 | Isohata et al. |
| 6,324,054 | B1 | 11/2001 | Chee et al. |
| 6,373,702 | B2 | 4/2002 | Oishi et al. |
| 6,524,692 | B1 | 2/2003 | Rosen |
| 6,603,620 | B1 | 5/2003 | Berding |
| 6,596,976 | B2 | 7/2003 | Lin et al. |
| 6,627,818 | B2 | 9/2003 | Kamel et al. |
| 6,633,481 | B2 | 10/2003 | Pavol |
| 6,647,328 | B2 | 11/2003 | Walker |
| 6,664,491 | B2 | 12/2003 | Yanai et al. |
| 6,665,192 | B2 | 12/2003 | Wimberger Friedl et al. |
| 6,701,529 | B1 | 3/2004 | Rhoades et al. |
| 6,744,186 | B2 | 6/2004 | Oishi et al. |
| 6,785,566 | B1 | 8/2004 | Irizarry |
| 6,809,916 | B2 | 10/2004 | Nakata et al. |
| 6,859,357 | B2 | 2/2005 | Morimoto et al. |
| 6,871,888 | B2 | 3/2005 | Yamagiwa |
| 6,924,996 | B2 | 8/2005 | Sugawara |
| 6,968,954 | B2 | 11/2005 | Hsieh |
| 7,009,835 | B2 | 3/2006 | Desai et al. |
| 7,059,182 | B1 | 6/2006 | Ragner |
| 7,094,094 | B2 | 8/2006 | Zahnen et al. |
| 7,113,351 | B2 | 9/2006 | Hovanky |
| 7,133,281 | B2 | 11/2006 | Bae |
| 7,167,360 | B2 | 1/2007 | Inoue et al. |
| 7,193,581 | B2 | 3/2007 | Tyler et al. |
| 7,259,357 | B2 | 8/2007 | Walker |
| 7,260,885 | B2 | 8/2007 | Albrecht et al. |
| 7,369,345 | B1 | 5/2008 | Li et al. |
| 7,373,863 | B2 | 5/2008 | O'Banion et al. |
| 7,382,567 | B2 | 6/2008 | Liao et al. |
| 7,393,575 | B2 | 7/2008 | Boss |
| 7,450,332 | B2 | 11/2008 | Pasolini et al. |
| 7,463,436 | B2 | 12/2008 | Takahashi et al. |
| 7,477,469 | B2 | 1/2009 | Cook et al. |
| 7,492,544 | B2 | 2/2009 | Jeansonne et al. |
| 7,532,478 | B2 | 5/2009 | Jeong |
| 7,554,798 | B2 | 6/2009 | Tanokuchi et al. |
| 7,568,942 | B1 | 8/2009 | Lannon et al. |
| 7,612,994 | B2 | 11/2009 | Ulrich et al. |
| 7,619,891 | B2 | 11/2009 | Woo et al. |
| 7,643,243 | B2 | 1/2010 | Lee et al. |
| 7,652,892 | B2 | 1/2010 | Shiu et al. |
| 7,660,107 | B2 | 2/2010 | Leung |
| 7,677,538 | B2 | 3/2010 | Darnell et al. |
| 7,684,183 | B2 | 3/2010 | Mori et al. |
| 7,760,289 | B2 | 7/2010 | Nakanishi et al. |
| 7,817,373 | B2 | 10/2010 | Choi et al. |
| 7,839,051 | B2 | 11/2010 | Klinghult |
| 7,855,892 | B2 | 12/2010 | Lin |
| 8,075,981 | B2 | 12/2011 | Pearce et al. |
| 8,093,811 | B2 | 1/2012 | Tanokuchi et al. |
| 8,106,789 | B2 | 1/2012 | Yang et al. |
| 8,113,494 | B2 | 2/2012 | Sunder |
| 8,144,453 | B2 | 3/2012 | Brown et al. |
| 8,189,280 | B2 | 5/2012 | Ollila et al. |
| 8,190,015 | B2 | 5/2012 | Lin et al. |
| 8,248,777 | B2 | 8/2012 | Prest |
| 8,289,689 | B2 | 10/2012 | Chen et al. |
| 8,289,715 | B2 | 10/2012 | Takahara |
| 8,297,601 | B2 | 10/2012 | Vito et al. |
| 8,305,744 | B2 | 11/2012 | Shedletsky et al. |
| 8,330,305 | B2 | 12/2012 | Hart et al. |
| 8,352,077 | B2 | 1/2013 | Goswami et al. |
| 8,411,432 | B1 | 4/2013 | Zimlin et al. |
| 8,446,475 | B2 | 5/2013 | Topliss et al. |
| 8,467,133 | B2 | 6/2013 | Miller |
| 8,485,053 | B2 | 7/2013 | Lee et al. |
| 8,503,121 | B2 | 8/2013 | Osaka et al. |
| 8,564,424 | B2 | 10/2013 | Evarts et al. |
| 8,749,958 | B2 | 6/2014 | Li |
| 8,862,182 | B2 | 10/2014 | Shukla et al. |
| 8,896,995 | B2 | 11/2014 | Shedletsky et al. |
| 8,903,519 | B2 | 12/2014 | King et al. |
| 8,964,298 | B2 | 2/2015 | Haddick et al. |
| 8,979,943 | B2 | 3/2015 | Evans et al. |
| 9,107,298 | B2 | 8/2015 | Prest |
| 9,116,668 | B2 | 8/2015 | Xiaozhuo et al. |
| 9,129,659 | B2 | 9/2015 | Montevirgen et al. |
| 9,167,061 | B2* | 10/2015 | Shuster ............... H04M 1/026 |
| 9,300,773 | B2 | 3/2016 | Mittleman et al. |
| 9,357,043 | B2* | 5/2016 | Sheynblat ............ G06F 1/1626 |
| 9,544,407 | B2* | 1/2017 | Shuster ............... H04M 1/026 |
| 2003/0168790 | A1 | 9/2003 | Larson |
| 2005/0017396 | A1 | 1/2005 | Pearce et al. |
| 2006/0109581 | A1 | 5/2006 | Li et al. |
| 2008/0024972 | A1 | 1/2008 | Yamaguchi |
| 2008/0091309 | A1 | 4/2008 | Walker |
| 2008/0192124 | A1 | 8/2008 | Nagasaki |
| 2010/0149073 | A1 | 6/2010 | Chaum et al. |
| 2010/0272969 | A1 | 10/2010 | Taylor |
| 2011/0228460 | A1 | 9/2011 | Kim et al. |
| 2012/0212484 | A1 | 8/2012 | Haddick et al. |
| 2012/0212499 | A1 | 8/2012 | Haddick et al. |
| 2013/0035139 | A1* | 2/2013 | Sheynblat ............ G06F 1/1626 455/566 |
| 2013/0257582 | A1 | 10/2013 | Rothkopf et al. |
| 2013/0260827 | A1* | 10/2013 | Shuster ............... H04M 1/026 455/556.1 |
| 2013/0278631 | A1 | 10/2013 | Border et al. |
| 2013/0285490 | A1 | 10/2013 | Rothkopf et al. |
| 2015/0116268 | A1 | 4/2015 | Shedletsky et al. |
| 2015/0318462 | A1* | 11/2015 | Kim .................... G06F 3/016 310/332 |
| 2015/0331456 | A1 | 11/2015 | Moon |
| 2015/0341070 | A1* | 11/2015 | Sanford ............... H04B 1/3888 455/575.8 |
| 2016/0030835 | A1* | 2/2016 | Argiro ................ A63F 13/02 463/33 |
| 2016/0044149 | A1* | 2/2016 | Shuster ............... H04M 1/026 455/550.1 |
| 2016/0365115 | A1* | 12/2016 | Boliek ................ G06F 3/0484 |
| 2017/0277282 | A1* | 9/2017 | Go ..................... G06F 3/0346 |

FOREIGN PATENT DOCUMENTS

| | | |
|---|---|---|
| GB | 1133198 | 11/1968 |
| JP | 2008067160 | 3/2008 |
| JP | 2009104407 | 5/2009 |
| JP | 2011099758 | 5/2011 |
| WO | WO2010/135421 | 11/2010 |

\* cited by examiner

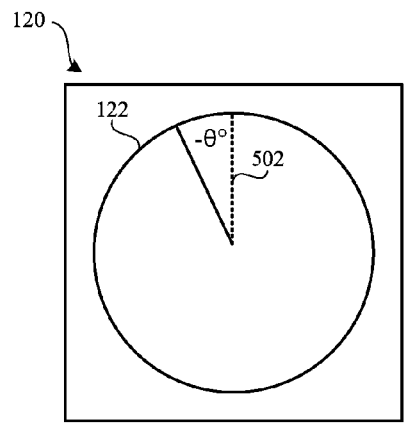
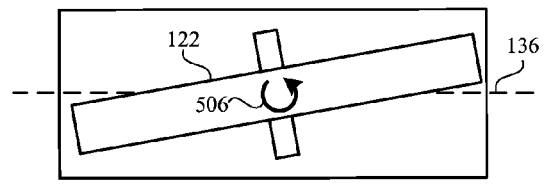
*FIG. 5A*  *FIG. 5B*
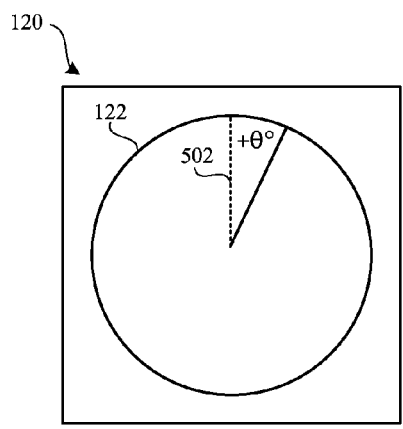
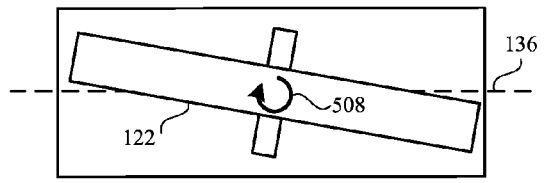
*FIG. 5C*  *FIG. 5D*

CONTROLLED GYROSCOPIC TORQUE FOR AN ELECTRONIC DEVICE

CROSS-REFERENCE TO RELATED APPLICATIONS

This application is a nonprovisional patent application of and claims the benefit to: 1) U.S. Provisional Patent Application No. 62/023,274, filed Jul. 11, 2014 and titled "Controlled Gyroscopic Torque for an Electronic Device;" and 2) U.S. Provisional Patent Application No. 62/151,277, filed Apr. 22, 2015 and titled "Controlled Gyroscopic Torque for an Electronic Device;" the disclosures of which are hereby incorporated herein by reference in its entirety.

FIELD

The present invention relates generally to electronic devices, and more particularly to gyroscopes in electronic devices. Still more particularly, the present invention relates to generating controlled gyroscopic torque in an electronic device.

BACKGROUND

Mobile electronic devices, such as smart telephones and tablet computing devices, are capable of providing various types of feedback to a user. For example, to alert the user to the occurrence of an event, an electronic device may ring, vibrate, emit light flashes, or the like. Additionally, mobile electronic devices are commonly used by a user to interact with application programs and other media content such as videos. For example, numerous gaming applications can be played on a mobile electronic device. Various types of actions or events can occur in application programs and videos. Explosions, crashes, driving a vehicle, and flying a plane are examples of actions and events that can occur, and these actions and events are viewed, and in some cases, heard by the user.

Stationary electronic devices, such as video game consoles, generally provide visual, auditory, and vibrational feedback to a user while the user is interacting with certain media content. In some situations, one or more torques is generated to provide feedback to the user. The torque feedback systems, however, may not suitable for mobile electronic devices because the torque feedback system requires a reference surface from which to apply the force. The lack of a reference surface from which to apply torques to a mobile electronic device limits the ways in which a mobile electronic device can interact with its surroundings and provide physical feedback to a user.

SUMMARY

Embodiments of mobile electronic devices can generate a torque in one or more directions to alter the orientation of a mobile electronic device. Altering the orientation of a mobile electronic device may be useful, for example, for providing physical feedback to a user of the mobile electronic device, or for reorienting the mobile electronic device in free-space.

A mobile electronic device includes a gyroscope in an enclosure of the mobile electronic device. The gyroscope is operably coupled to a control system. The control system is adapted to execute instructions that cause the mobile electronic device to detect an event and determine a characteristic of a gyroscopic torque to be transmitted to the mobile electronic device. The characteristic of the gyroscopic torque is based on a characteristic of the event. The control system is adapted to execute instructions that cause the mobile electronic device to alter the spatial orientation of the mobile electronic device by causing the gyroscope to generate the gyroscopic torque in accordance with the determined characteristic of the gyroscopic torque. In some embodiments, the control system is incorporated into a system processing device in the mobile electronic device.

A gyroscope module for altering the spatial orientation of a mobile electronic device may include at least one gyroscope coupled to a housing, wherein the housing is configured to be coupled to a mobile electronic device. The gyroscope module may include a control system operably connected to the gyroscope. The control system is adapted to execute instructions that cause the gyroscope module to receive, from the mobile electronic device, an indication of an event. The control system is adapted to execute instructions that cause the gyroscope module to determine a characteristic of a gyroscopic torque to be transmitted to the mobile electronic device. The characteristic of the gyroscopic torque is based on a characteristic of the event. The control system is adapted to execute instructions that cause the gyroscope module to alter the spatial orientation of the mobile electronic device by causing the gyroscope to generate the gyroscopic torque in accordance with the determined characteristic of the gyroscopic torque.

A method for operating the mobile electronic device includes detecting an event. A characteristic of a gyroscopic torque to be transmitted to the mobile electronic device is determined, wherein the characteristic of the gyroscopic torque is based on a characteristic of the event. The spatial orientation of the mobile electronic device is altered by generating the gyroscopic torque with the gyroscope in accordance with the determined characteristic of the gyroscopic torque.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

FIGS. 5A-5D are simplified depictions showing operation of an oscillating gyroscope;

DETAILED DESCRIPTION

Embodiments described herein provide a mobile electronic device that includes one or more gyroscopes (e.g., control-moment gyroscopes). Each gyroscope can produce a controlled gyroscopic torque or torques. Application of gyroscopic torque or torques alters the spatial orientation of the mobile electronic device, an effect that can be used for a variety of purposes. For example, gyroscopic torque or torques may be used to reorient a mobile electronic device when it is dropped. As another example, gyroscopic torque applied to a mobile electronic device when the device is being held in a user's hand may produce subtle changes to the spatial orientation of the device that are detected by the user as a rotation or motion of the device. In response to feeling the device begin to rotate, the user may resist and overcome the applied torque in order to return the device to a desired overall orientation and/or to prevent further rotation. In this way, application of gyroscopic torque or torques can be used to provide physical feedback to a user when the user is holding the device.

In some embodiments, the gyroscopic torque or torques may be generated in response to detection of an event. In some embodiments, an application program may be running on a processing device in the mobile electronic device, and the gyroscopic torque or torques may be generated based on events taking place in the application program. For example, a user can play a gaming application on the mobile electronic device, and the gyroscopic torque or torques may be produced for events, actions, and reactions as they occur in the gaming program.

In some embodiments, the gyroscopic torque or torques are generated based on the detection of other events. For example, the mobile electronic device may detect that it is in free fall, such as may occur when a user drops the device from his or her hand, or knocks the device off of an elevated surface, such as a table or desk. Upon detecting that the device is in free fall (and/or detecting that the device is likely to be damaged as a result of the fall), gyroscopic torque or torques may be generated in order to reorient the device in free-space. More particularly, the device may generate torque or torques in order to seek an orientation that is less likely to result in damage to the device upon impact.

Figure 1A:
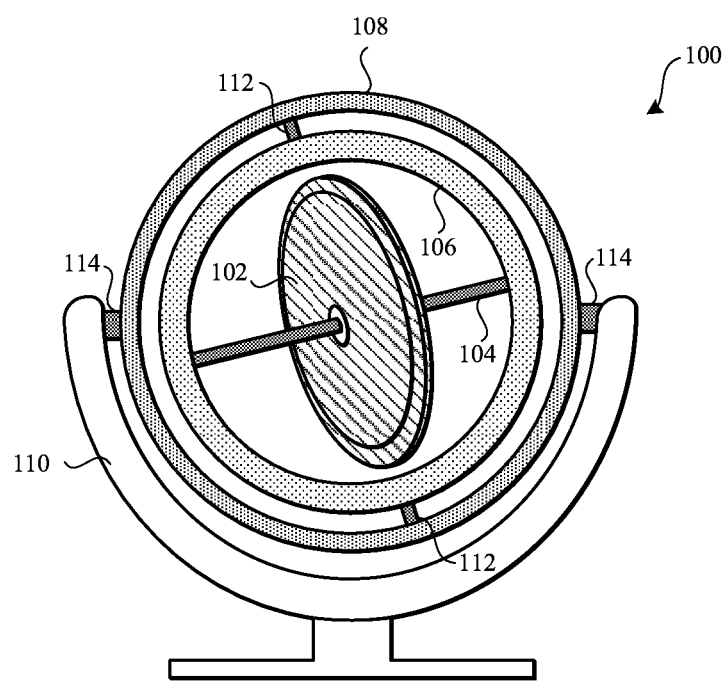
FIGS. 1A-1C illustrate examples of gyroscopes.

Referring now to FIG. 1A, there is shown an example of a rotating gyroscope. The gyroscope 100 includes a rotor 102 supported by a spin axis 104. The rotor 102 can rotate in two directions (i.e., clockwise or counterclockwise) on the spin axis 104. The rotor 102 and the spin axis 104 are mounted on an inner gimbal 106, and the inner gimbal 106 is mounted on an outer gimbal 108. The gimbals are supported by a frame 110. In addition to rotating about the spin axis 104, the gimbals 106, 108 allow the gyroscope to rotate around the axis 112 and the axis 114. A gyroscope mounted in two gimbals has two degrees of freedom (DOF). In other embodiments a gyroscope can have a different number of degrees of freedom. For example, a gyroscope may have three or more DOF.

A gyroscope may be configured differently in other embodiments. For example, a different type of support system can be used. As another example, a gyroscope may be supported by a different number of gimbals (e.g., three gimbals). In some embodiments, instead of or in addition to gyroscopes as described herein, torque is generated by a reaction wheel (e.g., a mass coupled to an end of a motor, which, when spun by the motor, imparts a torque on the device).

Figure 1C:
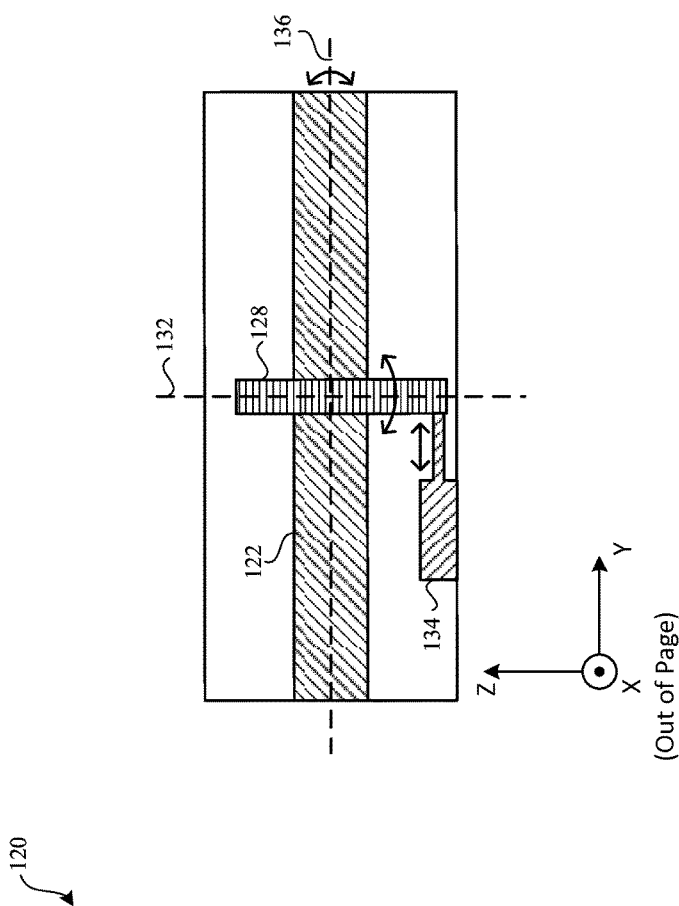
Figure 1B:
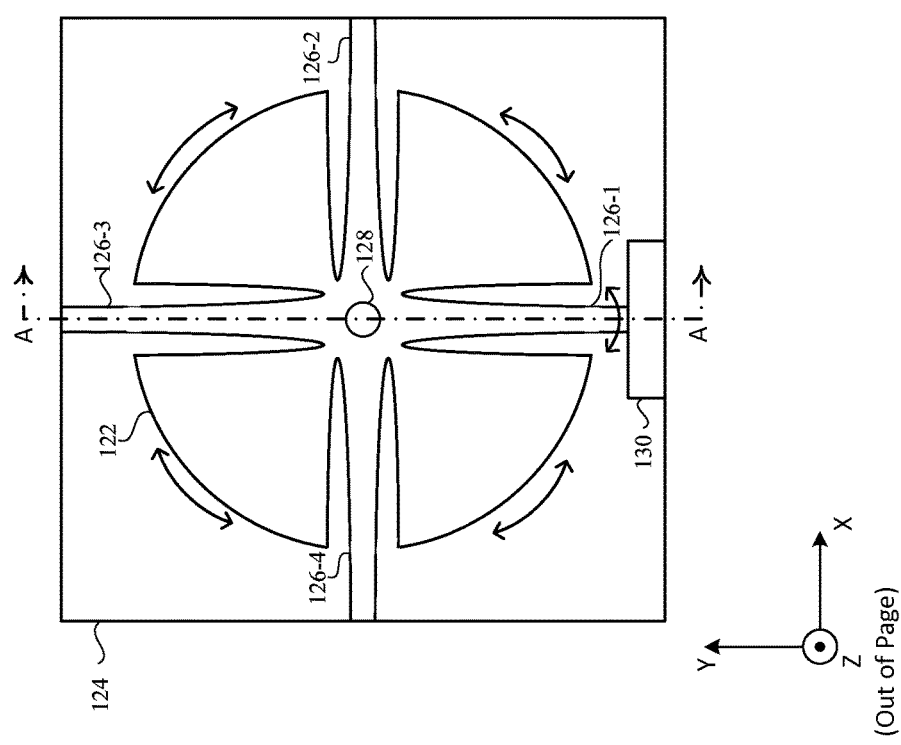

Referring now to FIG. 1B, there is shown an oscillatory gyroscope 120 in accordance with some embodiments. The oscillatory gyroscope 120 includes a mass 122 disposed within a housing 124. The mass 122 is coupled to the housing 124 via suspension members 126. In some embodiments, the mass 122 includes or is coupled to an actuation member 128.

The mass 122 is coupled to an oscillator mechanism 130 that is configured to oscillate the mass 122 about a rotation axis 132 (shown in FIG. 1C). The oscillator mechanism 130 imparts a cyclic impulse on the suspension member 126-1, resulting in oscillation of the mass about the rotation axis 132. The mass 122 may oscillate about the rotation axis any appropriate amount, such as +/−0.5 degrees, +/−1 degree, +/−5 degrees, +/−10 degrees, etc.

As shown in FIG. 1C, which illustrates a cross section of the gyroscope 120 taken through line A, the gyroscope 120 further includes an actuator 134 configured to tilt the mass 122. The actuator 134 acts upon the actuation member 128 to tilt the mass 122 out of a reference plane 136. In some embodiments, the actuator 134 need not physically touch or be coupled to the mass 122 or to the actuation member 128. For example, the actuator 134 may act upon the mass 122 by generating magnetic fields that interact with magnets and/or magnetic materials (not shown) coupled to the mass 122 and/or the actuation member 128.

In some embodiments, other actuators are used instead of or in addition to the actuator 134. For example, a voice coil (not shown) disposed under and/or over a portion of the mass 122 and a magnet (not shown) coupled to the mass 122 may be used to tilt the mass 122 out of the reference plane 136. Moreover, an actuator (or multiple actuators) may be used in a single gyroscope to tilt the mass 122 out of the reference plane 136 in more than one direction. For example, one or more actuators may be used to tilt the mass 122 along arcs in both the x-z plane and the y-z plane (and/or any other plane(s)).

Figure 2:
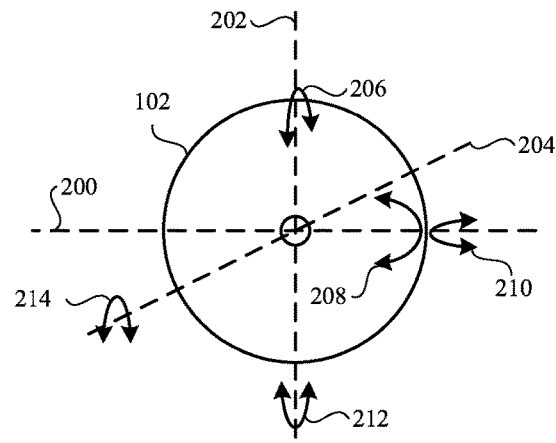
FIG. 2 is a simplified depiction showing operation of a gyroscope.

Examples of different gyroscopes and gyroscope configurations are now described briefly. FIG. 2 is a simplified depiction showing operation of a gyroscope. The rotor 102 is depicted with respect to three orthogonal axes 200, 202, 204 (e.g., x, y, and z axes). When an actuation force is applied to the gyroscope, the orientation of the spin axis is changed and one or more torques is produced. The generated torque is equal to the opposite of the change in angular momentum of the gyroscope. The direction of the torque depends on the direction of rotation of the rotor (also referred to as the spin axis) and the direction of out-of-plane tilt applied to the rotor (also referred to as the precession axis). The amount and duration of the torque depends on the speed of rotation and the inertia of the rotor.

When the single gyroscope shown in FIG. 2 is a dual direction gyroscope having variable speed control and multiple degrees of freedom, actuation or the application of a force 206, 208 along two DOF creates torques 210, 212, 214 in all three axes. For example, the force actuation 206 on the rotor 102 along axis 202 produces torques 212 and 214. The force actuation 208 on the rotor 102 along axis 200 produces torques 210 and 214. When two counter-rotating and counter-actuated gyroscopes are used, and the two gyroscopes have multiple degrees of actuation, the gyroscopes can independently apply torque in two directions. For example, in FIG. 3, actuation 300, 302 along two DOF creates torques 304, 306 in two axes.

Figure 4:
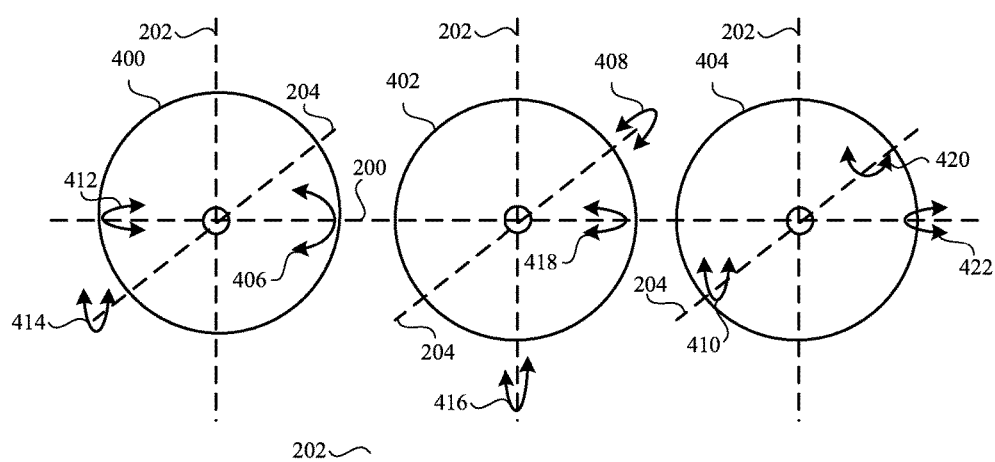
FIG. 4 is a simplified depiction showing operation of three gyroscopes.

FIG. 4 is a simplified depiction showing operation of three gyroscopes. Each gyroscope can be nominally oriented to one axis 200, 202, or 204. For example, the gyroscope with rotor 400 can be nominally oriented to the axis 204 (i.e., the z-axis). The gyroscope with rotor 402 can be nominally oriented to the axis 200 (i.e., the x-axis). The gyroscope with rotor 404 can be nominally oriented to the axis 202 (i.e., the y-axis). With independent actuation 406, 408, 410, torques 412, 414, 416, 418, 420, 422 can be produced in three directions. In the illustrated embodiment, the net torque can be in any direction and predominately confined to a single direction through torque cancellation between any two gyroscope pairs.

Figure 13A:
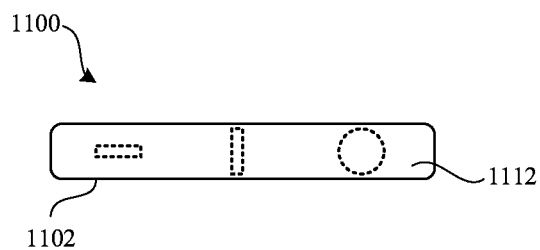
FIGS. 13A-13C are diagrams illustrating one example of a mobile electronic device that includes gyroscopes.
Figure 13B:
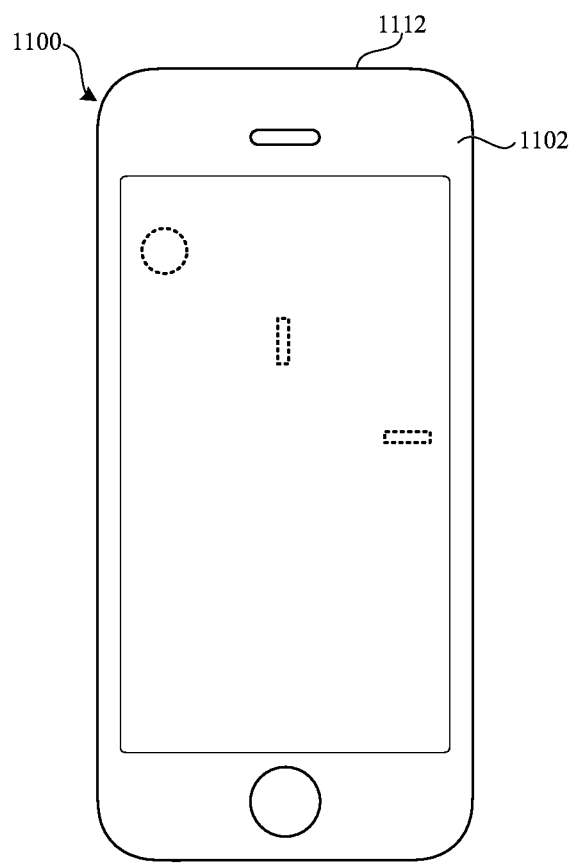
Figure 13C:
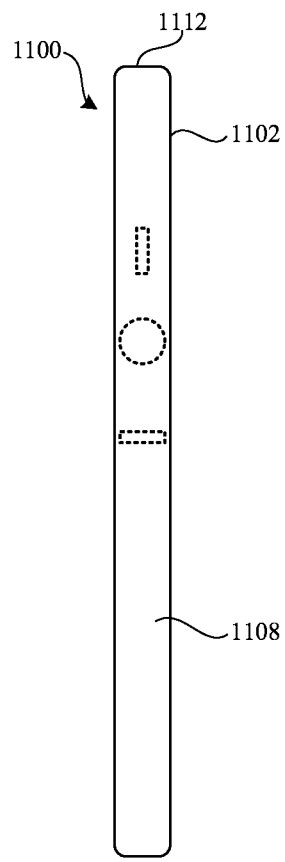

FIGS. 13A-13C illustrate top, front, and side views, respectively, of an electronic device 1100 showing example locations and orientations of the rotor/mass of gyroscopes 1300, 1302, and 1304 within the mobile electronic device (shown in phantom). For clarity, only the rotor of the gyroscopes 1300, 1302, and 1304 are shown. More or fewer gyroscopes may be included in an electronic device than are shown in FIGS. 13A-13C, and in different orientations. By orienting the rotors/masses of the gyroscopes 1300, 1302, and 1304 in different planes, torques in different directions can be produced, and torques from one or more gyroscopes can be used to cancel torques from one or more other gyroscopes, as described above.

Other embodiments can include more gyroscopes. For example, two pairs of dual counter rotating and counter actuated gyroscopes with a single DOF can be used, or three pairs of dual counter rotating and counter actuated gyroscopes with a single DOF can used. The torque may be isolated in a single direction because the torque in the other direction cancels for each pair of gyroscopes. In such embodiments, torque can be applied in two directions independently. These embodiments enable independent and a more precise control of the torque in each direction.

Figure 3:
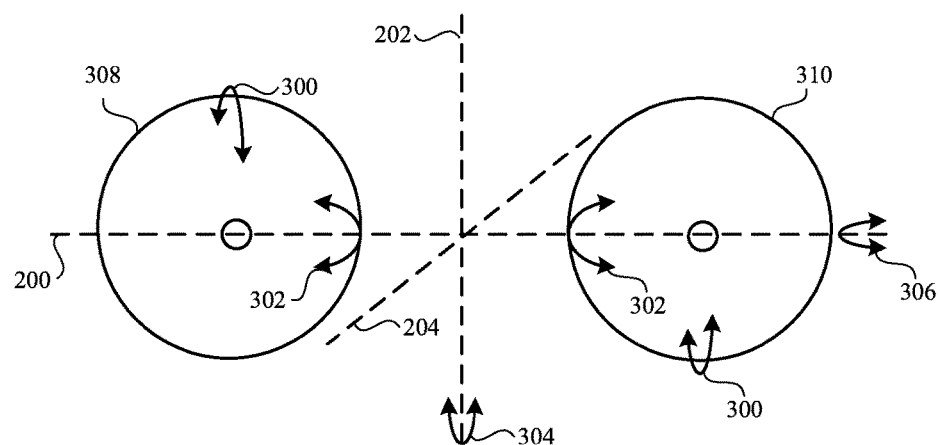
FIG. 3 is a simplified illustration showing operation of dual gyroscopes.

The principles of operation shown and described with reference to FIGS. 2-4 apply to both rotating gyroscopes (e.g., gyroscope 100) and oscillating gyroscopes (e.g., gyroscope 120). For a rotating gyroscope to produce a steady (i.e., non-oscillating) torque, the rotor is actuated in a particular direction. In other words, as long as the rotor is actuated in the particular direction, a corresponding torque is produced in one or more other directions (as shown and described with respect to FIGS. 2-4). In an oscillatory gyroscope, by contrast, the mass is oscillating about an axis (i.e., it is twisting back and forth about the axis, as shown and described with respect to FIGS. 5A and 5C) instead of continuously rotating about the axis. Accordingly, an appropriate phase relationship between the oscillation of the mass about the axis and the direction that the mass is tilted may be maintained in order to produce a desired torque. In one example, in order to generate a torque that does not oscillate (e.g., a torque in a rotational direction), the direction that the mass is tilted changes when the direction of rotation of the mass changes.

Referring now to FIGS. 5A-5D, there is shown a simplified depiction of the gyroscope 120 demonstrating the oscillation and actuation of the mass 122 to generate a torque in one direction. FIGS. 5A-5B illustrate a top and side view, respectively, of the gyroscope 120 when the mass 122 is deflected in the negative direction. The side view in FIGS. 5B and 5D corresponds to a non-cross sectional view of the same side shown in FIG. 1C. As shown in FIG. 5A, the mass 122 has been deflected −θ° from a center position (shown by line 502). As shown in FIG. 5A, when the mass 122 is deflected −θ° from the center position, the mass 122 is also tilted in a first direction (as shown by arrow 504). As shown in FIG. 5B, the mass 122 is tilted along an arc in the y-z plane. As the mass 122 is then rotated in the positive direction (FIG. 5C), the mass 122 is tilted in the direction opposite to the first direction (as shown by arrow 506) while the mass 122 is moving towards its maximum deflection in the positive direction. FIGS. 5C-5D illustrate a top and side view, respectively, of the gyroscope 120 when the mass 122 is deflected in the positive direction (i.e., +θ° from center). As shown in FIG. 5D, the mass 122 has been tilted in the direction opposite to that shown in FIG. 5B. As the oscillation continues and the mass 122 is deflected in the negative direction once again, the direction that the mass 122 is tilted is reversed. As a result of the oscillation and corresponding tilting of the mass 122, a non-oscillating torque in a particular direction may be maintained. Further, torque in a different direction can be generated by tilting the mass 122 in a different manner. For example, tilting the mass 122 in the direction opposite to that shown in FIGS. 5B and 5D (when the mass 122 is rotated as shown in FIGS. 5A and 5C) will result in torque in a direction opposite to the particular direction.

Figure 6:
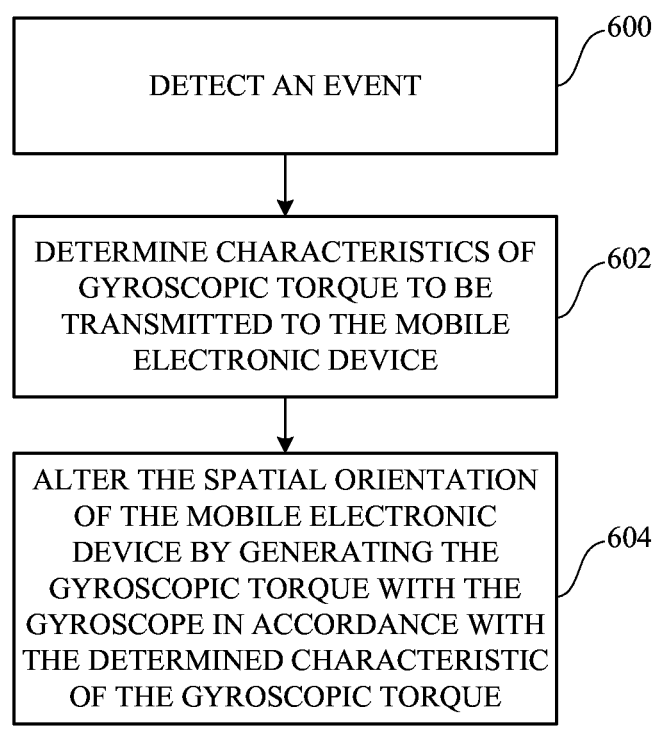
FIG. 6 is a flowchart of one exemplary method for generating controlled gyroscopic torque in a mobile electronic device.

Referring now to FIG. 6, there is shown a flowchart of one exemplary method for generating controlled gyroscopic torque in a mobile electronic device. Initially, as shown in block 600, an event is detected by a control system or processing device.

In some embodiments, detecting the event includes receiving a characteristic of torque feedback to be provided to a user based on an event occurring in an application program presented to the user on the display. For example, the torque feedback and event can be associated with an event occurring in an application program, such as a gaming application. As a specific example, a segment of a gaming application may require a user to navigate a vehicle through a turn in a road. Accordingly, the gaming program may provide the characteristics of the torque feedback to be provided to the user. Characteristics of the torque feedback to be provided to the user may include an event type (e.g., left-hand turn) and/or a duration of the event (e.g., 1 second).

In some embodiments, detecting the event includes: determining that the mobile electronic device is in free fall; determining a spatial condition of the mobile electronic device during the free fall; and predicting a damaging impact based on the determined spatial condition of the mobile electronic device. For example, an accelerometer, an orientation-detecting gyroscope (which may be distinct from a gyroscope that generates and applies torque to a device for altering its spatial orientation, such as a control-moment gyroscope), or any appropriate orientation and/or motion sensing system (including any combination of accelerometers, orientation-detecting gyroscopes, and/or other components) is used to determine that the mobile electronic device is in free fall, and to determine the spatial condition of the mobile electronic device during free fall. A free fall may result from a user dropping the device, knocking it off of an elevated surface, or the like. The spatial condition of the mobile electronic device refers to its orientation and/or motion during free fall. Thus, detecting the spatial condition may include detecting that the mobile electronic device is rotating at a certain angular velocity, and/or detecting that the device has a particular attitude (e.g., a particular set of Euler angles).

As noted above, detecting the event may include predicting a damaging impact based on the determined spatial condition of the mobile electronic device. In particular, when a mobile electronic device falls onto a surface (e.g., the ground or a floor), the attitude and/or rotation of the device at impact may affect the likelihood that damage, or a particular type of damage, may occur. For example, if a mobile electronic device falls directly on its display, it may be more likely that the display will break or be damaged than if the device falls on its edge or back. As another example, if a mobile electronic device falls while spinning rapidly, it may be more likely to damage the device than if the device falls in a stable (e.g., non-rotating) orientation.

Spatial conditions that are indicative of a damaging impact may be different for different mobile electronic devices. For example, for a device with a very strong display material and a relatively weaker frame material, a damaging impact may be predicted if the device is likely to fall onto its edge, but not if the device is likely to fall on its display. On the other hand, for a device with a relatively weaker display material and a relatively stronger frame material, a damaging impact may be predicted if the device is likely to fall onto its display, but not if the device is likely to fall on its edge or back.

Other factors may also affect whether a damaging impact is determined. For example, if damage is more likely to the frame material because it is relatively weak, but the replacement or repair cost for the display is much greater than for the frame, the damaging impact may be predicted if the device is likely to fall onto its display. While the likelihood of damage may be lower, the cost to replace or repair the damaged portion may be higher.

Next, as shown in block 602, based on the characteristics of the event, a characteristic of at least one gyroscopic torque to be transmitted to the mobile electronic device is determined. The characteristics of the event may include, for example, whether the event is a fall event, whether the event is a request to provide torque feedback to a user, a spatial condition of the mobile electronic device during a fall event, and/or any other characteristic or property of the event that may be used (in whole or in part) to determine the gyroscopic torque that is to be produced in response to the event. Additional event characteristics include but are not limited to a type of event (e.g., a fall event, an event from an application program, etc.), a duration of an event, a direction of an event (e.g., the direction of a turn in a gaming application), and a type or property of an application program from which an event originated.

The characteristic of the gyroscopic torque that is determined based on the characteristic of the event may include, for example, the magnitude of gyroscopic torque, the duration of the gyroscopic torque, the direction of the gyroscopic torque, and/or any characteristic of the actuation needed to produce the determined gyroscopic torque (e.g., the speed, force, direction, duration of application, distance, etc., of the actuation).

In some embodiments, the characteristic of the gyroscopic torque to be transmitted to the mobile electronic device is based on the characteristics of the torque feedback to be provided to a user. For example, if a user is interacting with a driving game, the torque feedback to be provided to the user may include a "turning" feedback intended to mimic or suggest the effect of a vehicle's steering wheel resisting a turn. In this case, the characteristic of the gyroscopic torque may be determined so as to produce the desired "turning" feedback to the user.

In some embodiments, the characteristic of the gyroscopic torque to be transmitted to the mobile electronic device is selected so as to reorient the mobile device during the free fall. For example, if a device is oriented during free fall such that it will likely fall directly onto its display, the characteristic of the gyroscopic torque may be selected so that the device will instead impact (or be more likely to impact) on its edge, side, or in any other orientation that is less likely to result in damage to the device.

In some embodiments, the characteristic of the gyroscopic torque to be transmitted to the mobile electronic device is based on the determined spatial condition of the mobile electronic device (e.g., the Euler angles of the device, the angular velocity of the device, etc.) and a target orientation. For example, a target orientation may be an orientation in which the device is less likely to suffer damage as a result of an impact, and/or an orientation in which resulting damage is cheaper to repair/replace than other orientations. Accordingly, a characteristic of gyroscopic torque (e.g., a magnitude, direction, duration of application, etc.) that will cause the device to move from the determined spatial condition toward the target orientation is determined.

Depending on the distance that the mobile electronic device falls, the spatial condition of the device during free fall, and the magnitude and direction of gyroscopic torque that can be produced, there may or may not be enough time for the device to arrive at the target orientation before it impacts the ground. The electronic device may nevertheless move toward the target orientation, as even a small movement toward the target orientation may result in less damage than might have otherwise occurred.

In some embodiments, the characteristic of the gyroscopic torque to be transmitted to the mobile electronic device is based on the determined spatial condition of the mobile electronic device (e.g., the Euler angles of the device, the angular velocity of the device, etc.) and a target angular velocity. For example, in cases where the goal of the application of gyroscopic torque is merely to slow the rotation of a device during a free-fall, the target angular velocity may be zero (e.g., a stable, non-rotating orientation).

In some embodiments, the characteristic of the gyroscopic torque to be transmitted may be based on the determined spatial condition of the device, a target orientation, a target angular velocity, and/or any combination of the aforementioned factors (including fewer or more factors than those listed).

Figure 11A:
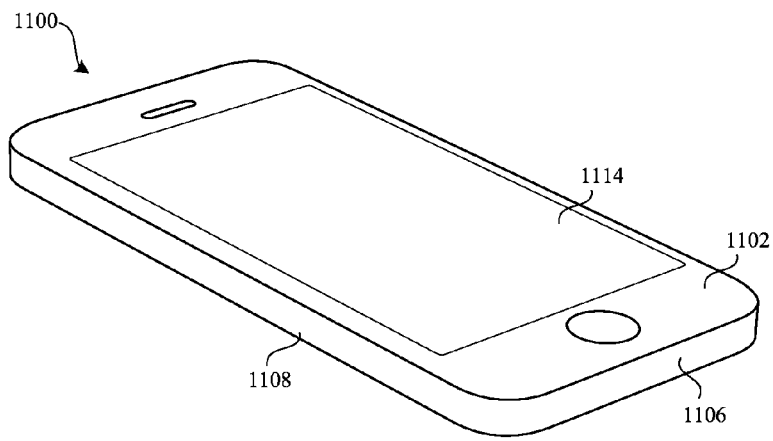
FIGS. 11A-11B are diagrams illustrating one example of a mobile electronic device.
Figure 11B:
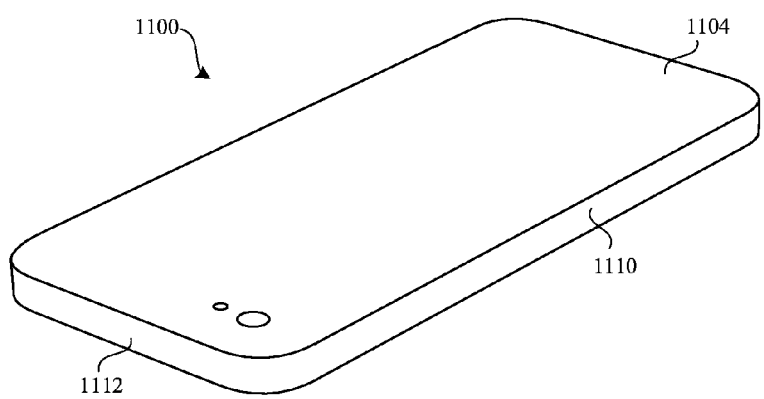

In some embodiments, multiple target positions exist for a given mobile electronic device. For example, as shown in FIGS. 11A-11B, a mobile electronic device 1100 may be a hexahedron having a front face 1102 opposite to a back face 1104, with the front and back faces 1102, 1104 set apart from one another by four edges 1106, 1108, 1110, and 1112. The front face 1102 may include a display 1114. The display 1114 may include glass or other material that is liable to crack or shatter if the display 1114 lands flat (or substantially flat) against the ground or a floor. If the device 1100 lands on an edge, however, the device 1100 may be more likely to withstand damage to the display or other expensive or delicate components (e.g., a camera lens). Accordingly, the target position may correspond to any of the edges 1106, 1108, 1110, or 1112 facing downward such that a plane corresponding to the display is perpendicular to the ground. The edge that is oriented downward for a particular target orientation (and thus will receive the majority of the force of impact) is referred to herein as the target edge.

Figure 12A:
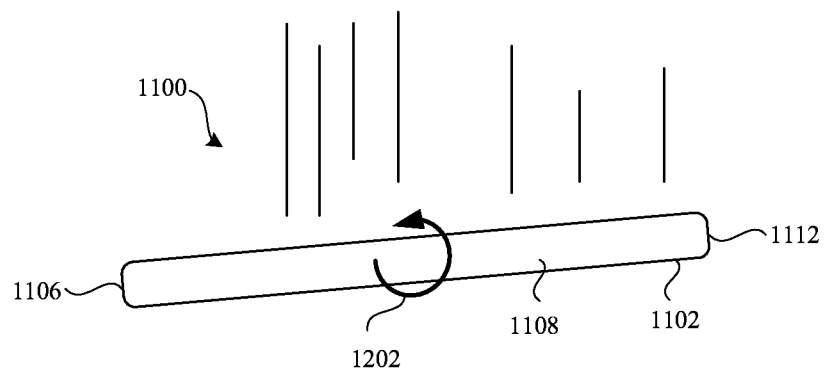
FIGS. 12A-12B are diagrams illustrating one example of reorientation of a mobile electronic device during free fall.
Figure 12B:
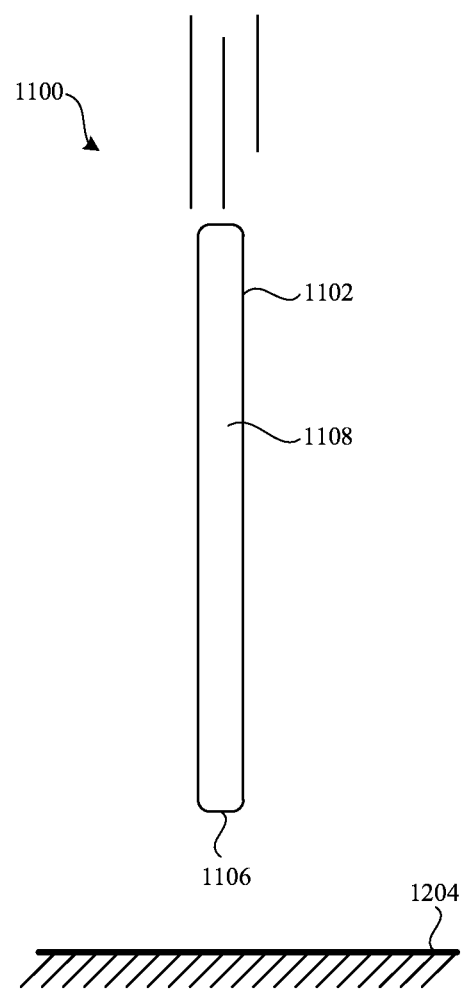

FIGS. 12A-12B illustrate a mobile electronic device 1100 being reoriented during free fall so that edge 1106 is facing downward. As shown in FIG. 12A, a gyroscopic torque, represented by arrow 1202, is applied to the device 1100 to cause it to rotate toward the target position shown in FIG.

12B (corresponding to edge 1106 facing downward and the display 1114 being substantially perpendicular to the ground 1204).

In some embodiments, the target edge, and hence the target orientation, is selected during the free fall based on the spatial condition of the device. In particular, in some embodiments, the target orientation that requires the least rotation of the mobile electronic device is selected. As a specific example, if the device would need only to be rotated 10° to arrive at a target position where edge 1106 is facing downward, but would need to be rotated 170° to arrive at a target position where edge 1112 is facing downward, then the former target position is selected.

In circumstances where the mobile electronic device is rotating while it is in free-fall, the characteristic of the gyroscopic torque may be determined based on the target orientation and characteristics of the rotation. For example, if the device is rotating toward the target orientation, the device may apply gyroscopic torque that resists or counteracts the rotation of the device so as to arrest the rotation of the device at or near the target orientation.

Next, as shown in block 604, the spatial orientation of the mobile electronic device is altered by generating the gyroscopic torque with the gyroscope in accordance with the determined characteristic of the gyroscopic torque. As described above, altering the spatial orientation of the mobile electronic device may be used to provide torque feedback to a user (e.g., by producing subtle changes in orientation that result in a user resisting further motion of the device), to reorient the device during a free fall, or for other possible uses.

Where the gyroscopic torque is being used to create torque feedback to be provided to the user, the change in the spatial orientation of the mobile electronic device may be opposed and/or corrected by the user (e.g., the user's hands may attempt to resist the change in spatial orientation, resulting in less change in spatial orientation than would occur if the device was in free-fall). Returning to the example of a driving game, when the user is turning a corner by rotating the mobile electronic device as if it were a steering wheel, the impulse may cause the device to rotate back to a center or neutral position, as a vehicle's steering wheel tends to do during a turn. The user may then resist or oppose the change in orientation of the device in order to maintain the desired turning response. While a driving game is used as an example of an application program in which torque feedback is provided to a user, torque feedback may be provided to a user during interactions with other application programs (e.g., other types of games, utilities, etc.) and/or media content (e.g., video, audio, etc.).

Figure 7:
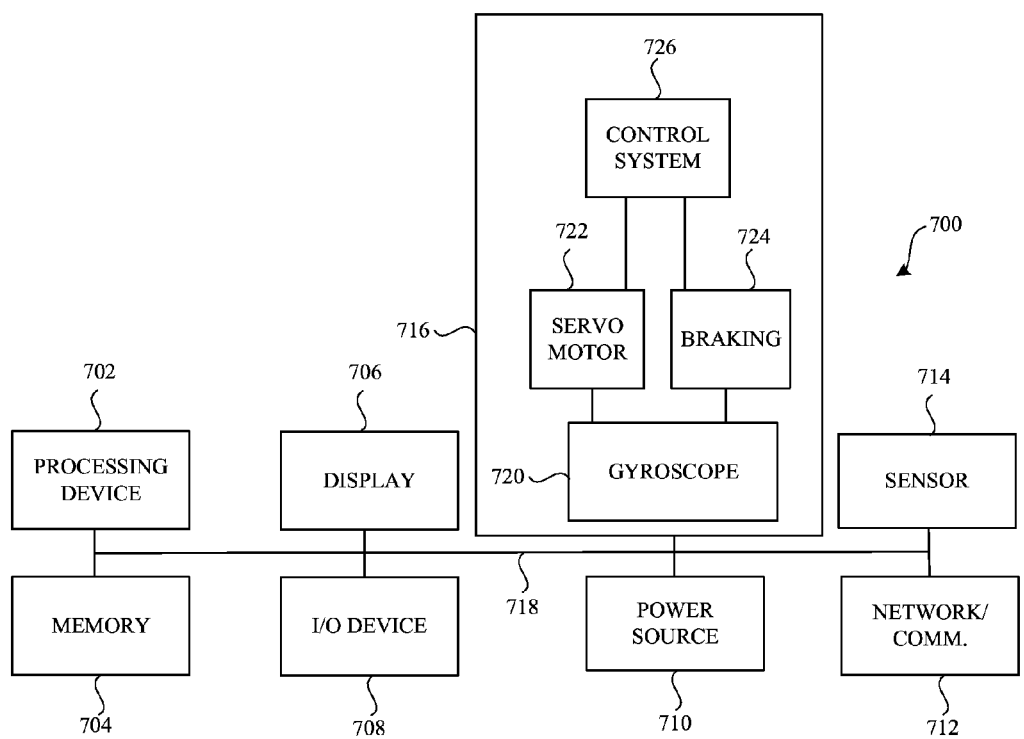
FIG. 7 is a block diagram of one example of a mobile electronic device that includes one or more gyroscopes.

FIG. 7 is a block diagram of one example of a mobile electronic device that includes one or more gyroscopes. The mobile electronic device can be implemented as any suitable mobile electronic device. For example, the electronic device may be a tablet computing device, a smart telephone, a digital media player, or any other appropriate electronic device.

The mobile electronic device 700 can include a processing device 702, a memory 704, a display 706, an input/output (I/O) device 708, a power source 710, a network communications interface 712, a sensor 714, and a gyroscope system 716. The processing device 702 can control some or all of the operations of the electronic device 700. The processing device 702 can communicate, either directly or indirectly, with substantially all of the components of the mobile electronic device 700. For example, a system bus or signal line 718 or other communication mechanism can provide communication between the processing device 702, the memory 704, the display 706, the I/O device 708, the power source 710, the network communications interface 712, the sensor 714, and/or the gyroscope system 716. The processing device 702 can be implemented as any electronic device capable of processing, receiving, or transmitting data or instructions. For example, the processing device 702 can be a microprocessor, a central processing unit (CPU), an application-specific integrated circuit (ASIC), a digital signal processor (DSP), or combinations of such devices. As described herein, the term "processing device" is meant to encompass a single processor or processing unit, multiple processors, multiple processing units, or other suitably configured computing element or elements.

The memory 704 can store electronic data that can be used by the mobile electronic device 700. For example, a memory can store electrical data or content such as, for example, audio and video files, applications, documents, device settings and user preferences, timing and control signals, biometric data, data structures or databases, and so on. The memory 704 can be configured as any type of memory. By way of example only, the memory can be implemented as random access memory, read-only memory, Flash memory, removable memory, or other types of storage elements, or combinations of such devices.

The display 706 may provide an image or video output for the electronic device 700. The display 706 may also provide an input region for one or more input devices, such as, for example, a touch sensing device and/or a fingerprint sensing device. The display 706 may be substantially any size and may be positioned substantially anywhere on the mobile electronic device 700. The display 706 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology.

One or more I/O devices 708 can transmit and/or receive data to and from a user or another electronic device. The I/O device(s) 708 can include a touchscreen, a touch sensing input surface such as a track pad, one or more buttons, one or more microphones or speakers, one or more ports such as a microphone port, and/or a keyboard.

The power source 710 can be implemented with any device capable of providing energy to the mobile electronic device 700. For example, the power source 710 can be one or more batteries or rechargeable batteries. Additionally or alternatively, the power source 710 can include a power cord that connects the electronic device to a wall outlet or a connection cable (e.g., USB cable) that connects the electronic device to another electronic device.

The network communication interface 712 can facilitate transmission of data to or from other electronic devices. For example, a network communication interface can transmit electronic signals via a wireless and/or wired network connection. Examples of wireless and wired network connections include, but are not limited to, cellular, Wi-Fi, Bluetooth, IR, and Ethernet.

The mobile electronic device 700 may also include one or more sensors 714 positioned substantially anywhere on the electronic device 700. The sensor or sensors 714 may be configured to sense substantially any type of characteristic, such as but not limited to, images, pressure, light, touch, heat, movement (e.g., angular velocity/acceleration, linear velocity/acceleration, etc.), relative motion, spatial orientation (e.g., Euler angles) and so on. For example, the sensor(s) 714 may be an image sensor, a heat sensor, a light or optical sensor, an accelerometer, a pressure transducer, a gyroscope, a magnet, a health monitoring sensor, and so on.

The gyroscope system 716 includes one or more gyroscopes. The gyroscope(s) may be positioned anywhere in the mobile electronic device when the electronic device is substantially rigid. Any suitable type of gyroscope may be used in the gyroscope system. As one example, a single dual direction gyroscope with variable speed control and multiple degrees of freedom may be used. As another example, two dual direction gyroscopes with variable speed control and multiple degrees of freedom may be used. The type and number of gyroscopes included in the gyroscope system can be based at least in part on the size and weight of the mobile electronic device and the amount and direction of each controlled gyroscopic torque to be produced. Moreover, as noted above, the gyroscope(s) may be one or more rotating gyroscopes, one or more oscillating gyroscopes, or a combination of rotating and oscillating gyroscopes.

A gyroscope system that includes a rotating gyroscope may further include one or more servo motors 722 and braking mechanisms 724. One or more servo motors can be operably connected to each gyroscope in the gyroscope system. The servo motors can produce control signals for the gyroscopes that control the speed, angle, and/or position of the gimbals of the gyroscopes. As one example, the servo motors can be connected between a rotor and the gimbal (e.g., at 110 and 112).

A braking mechanism 724 may be operably connected to each gyroscope. The braking mechanism can output control signals that cause a gyroscope to produce a gyroscopic torque in another direction by rapidly accelerating or decelerating the rotation speed of a gyroscope for a given period of time. For example, in the gaming application shown in FIG. 8 the braking mechanism may cause one or more gyroscopes to stop suddenly when a vehicle in the gaming application rapidly decelerates or crashes.

In some embodiments, a control system 726 may be included in the gyroscope system 716. The control system 726 converts a desired torque feedback or a desired change in orientation to gyroscopic movement (e.g., rotation speed, oscillation rate, actuation force/speed/distance/direction, etc.) that produces the desired feedback or change in orientation. In other embodiments, the control system 726 may be incorporated into the processing device 702.

It should be noted that FIG. 7 is illustrative only. In other examples, a mobile electronic device may include fewer or more components than those shown in FIG. 7. For example, some of the components shown in FIG. 7 can be implemented in a separate electronic device that is operatively connected to the mobile electronic device 700 through a wired or wireless connection. As one example, at least one I/O device can be included in a separate electronic device that is operably connected to the electronic device 700. As another example, the gyroscope system 716 may be in a separate electronic device that is operably connected to the mobile electronic device 700. For example, the gyroscope system 716 may be in a case, a gaming peripheral (e.g., a controller and/or handle apparatus to which a mobile electronic device physically and/or communicatively couples), or the like.

Figure 8:
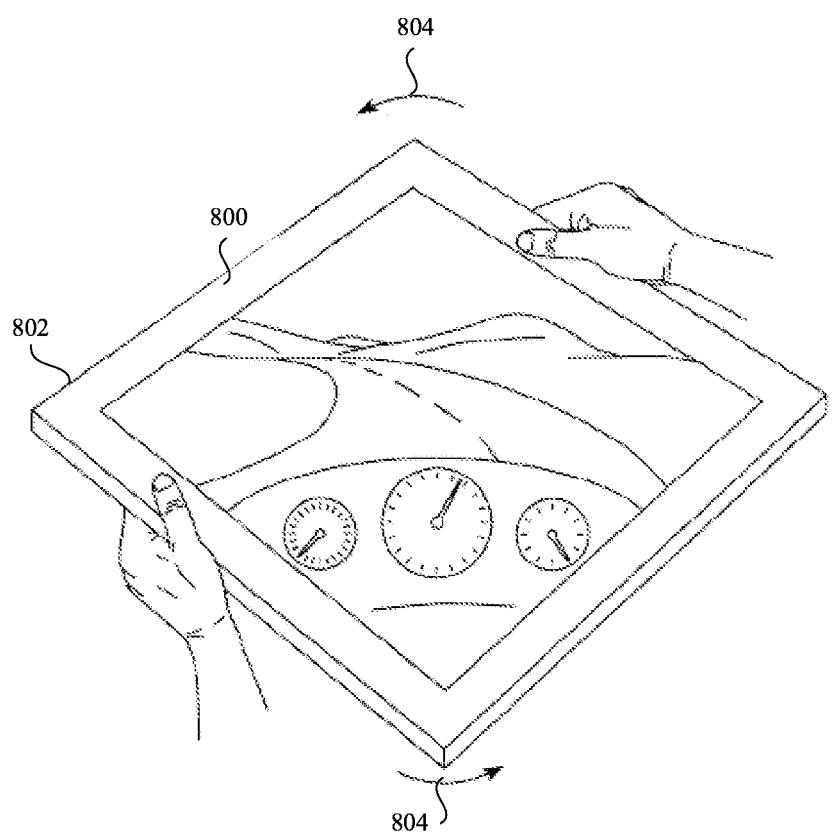
FIGS. 8-10 are diagrams illustrating a gaming application that can employ a controlled gyroscopic torque.
Figure 9:
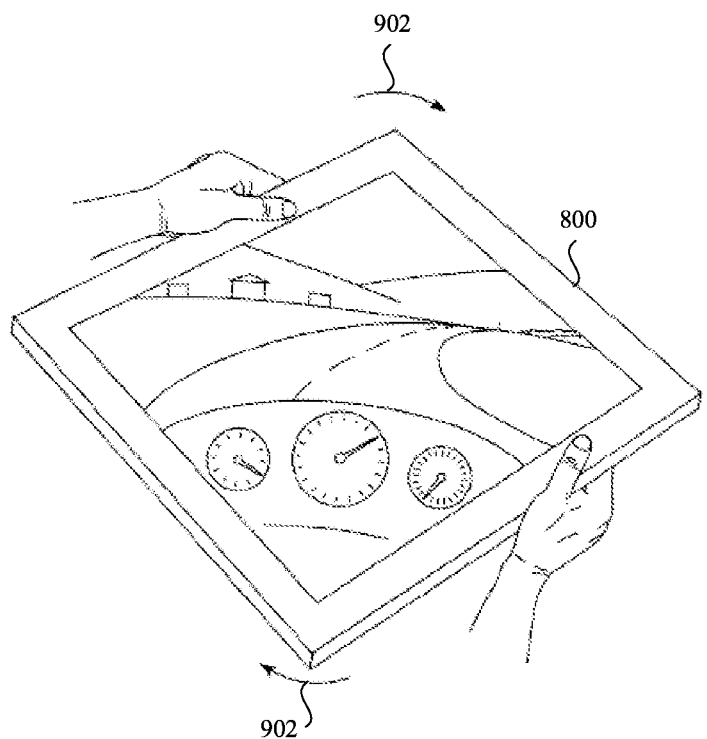
Figure 10:
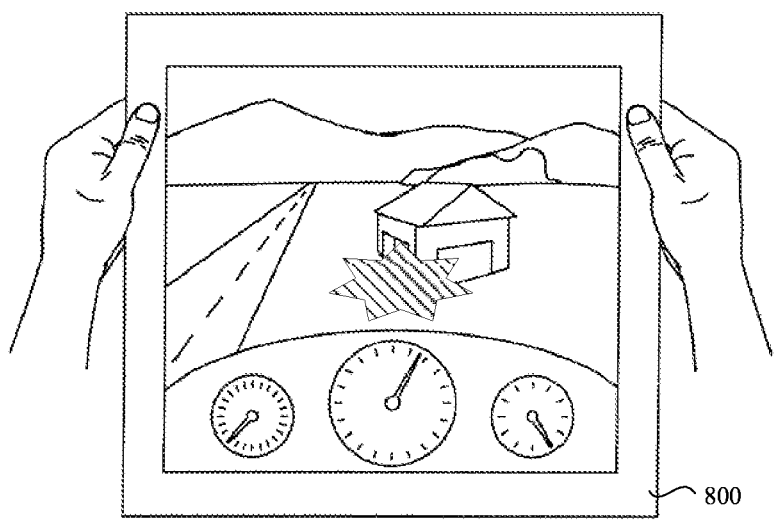

Referring now to FIGS. 8-10, there are shown diagrams of an example gaming application that can employ controlled gyroscopic torque. In one embodiment, the software for the gaming application is executed by the processing device 702 in FIG. 7. In the illustrated embodiment, a user is holding a mobile electronic device 800 having one or more gyroscopes secured within the enclosure 802. The user is using the mobile electronic device 800 as a steering wheel of a vehicle. As shown in FIG. 8, when a scene includes a road curved to left, the user is required to turn the steering wheel to the left in order to stay on the road (left turn indicated by arrows 804). One or more gyroscopes included in the mobile electronic device may be used to produce a controlled gyroscopic torque or torques that cause the user to feel feedback suggestive of the resistance of an actual steering wheel when turning a vehicle to the left. The amount of gyroscopic torque(s) and/or the frequency of the gyroscopic torque(s) that is created may be based in part on the turning angle, the distance of the turn, and the speed of the vehicle (among other possible factors).

In FIG. 9, when the scene changes to a road curved to right, the user is required to turn the steering wheel to the right in order to stay on the road (right turn indicated by arrows 902). One or more gyroscopes in the mobile electronic device may be used to produce a controlled gyroscopic torque or torques that cause the user to feel feedback suggestive of the resistance of an actual steering wheel when turning a vehicle to the right. Again, the amount of gyroscopic torque(s) and/or the frequency of the gyroscopic torque(s) that is created may be based in part on the turning angle, the distance of the turn, and the speed of the vehicle (among other possible factors).

If it is detected that the mobile electronic device 800 is turning when the vehicle should be moving straight, or the vehicle is not turned sufficiently to complete a turn, the gaming application may display a crash scene (crash represented by hashed star in FIG. 10). The braking mechanism 724 in FIG. 7 may cause the gyroscope system to produce the appropriate controlled gyroscopic torque that permits the user to feel the crash. For example, the vehicle should stop suddenly and may turn one direction. If the gaming application displays a more serious crash, such as when the crash causes the vehicle to roll over, the braking mechanism 724 and the gyroscope system can generate the appropriate controlled gyroscopic torques that allow the user to feel the crash and rollover.

Additionally, a controlled gyroscopic torque that rotates the mobile electronic fore and aft (i.e., towards and away from a user) may be produced to mimic or suggest the sensation of a vehicle accelerating or decelerating. In some embodiments, a gyroscopic torque that tends to rotate the top of the mobile electronic device 800 (as viewed by a user when interacting with an application program) toward the user may suggest acceleration, where a gyroscopic torque that tends to rotate the top of the mobile electronic device 800 away from the user may suggest deceleration. In other embodiments, the directions of rotation are reversed for acceleration and deceleration.

According to certain embodiments, a controlled gyroscopic torque or torques may be produced for other types of application programs. For example, in a flying game, a user could hold the mobile electronic device as if the user is steering a flying object (e.g., an airplane), where one or more gyroscopes are used to produce appropriate controlled gyroscopic torques while the object is flying, landing, and stopping. For example, a controlled gyroscopic torque or torques may be generated to turn the flying object and to increase or decrease the speed of the flying object. As another example, a controlled gyroscopic torque(s) may be generated while a user is watching a video, such as a movie. Appropriate controlled gyroscopic torque(s) or torques may be produced for events that occur during the movie.

The controlled gyroscopic torques can be generated to allow the user to feel or experience an action. Additionally, controlled gyroscopic torques can be created to provide resistance to an action, and the user may feel that resistance. As discussed earlier, gyroscopic torques can be produced in one direction or in multiple directions depending on the number of gyroscopes in a mobile electronic device and the orientation of those gyroscopes within the mobile electronic device. The controlled gyroscopic torques can be created when a user is interacting with an application program.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method for operating a mobile electronic device that includes a gyroscope and a display in an enclosure of the mobile electronic device, the method comprising:
   detecting an event;
   determining a characteristic of a gyroscopic torque to be transmitted to the mobile electronic device, wherein the characteristic of the gyroscopic torque is based on a characteristic of the event; and
   altering a spatial orientation of the mobile electronic device by causing the gyroscope to generate the gyroscopic torque with the gyroscope in accordance with the determined characteristic of the gyroscopic torque, the generating the gyroscopic torque comprising:
     rotationally oscillating a mass about a first axis while tilting the mass about a second axis;
     while the mass is being rotated in a first direction about the first axis during the rotational oscillation, tilting the mass in a second direction about the second axis;
     while the mass is being rotated in a third direction about the first axis during the rotational oscillation, tilting the mass in a fourth direction about the second axis; and
     transmitting a force corresponding to the gyroscopic torque through the enclosure, wherein
   the first direction is opposite to the third direction; and
   the second direction is opposite to the fourth direction.

2. The method of claim 1, wherein detecting the event includes receiving a characteristic of torque feedback to be provided to a user based on an event occurring in an application program presented to the user on the display.

3. The method of claim 2, wherein the characteristic of the torque feedback to be provided to the user comprises one of an event type and a duration of the event.

4. The method of claim 1, wherein detecting the event includes:
   determining that the mobile electronic device is in free fall;
   determining a spatial condition of the mobile electronic device during the free fall; and
   predicting a damaging impact based on the determined spatial condition of the mobile electronic device.

5. The method of claim 4, the spatial condition is an angular velocity of the mobile electronic device.

6. The method of claim 4, wherein the characteristic of the gyroscopic torque is determined so as to reorient the mobile electronic device during the free fall.

7. The method of claim 4, wherein:
   the spatial condition is an orientation of the mobile electronic device; and
   the characteristic of the gyroscopic torque is based on the determined spatial condition of the mobile electronic device and a target orientation.

8. The method of claim 7, wherein the target orientation corresponds to a display plane of the display being substantially perpendicular to a ground plane.

9. The method of claim 7, wherein the target orientation corresponds to an edge of the mobile electronic device being substantially parallel to a ground plane.

10. The method of claim 7, wherein the target orientation is selected so as to reduce damage to the mobile electronic device resulting from the free fall.

11. The method of claim 4, wherein:
    the spatial condition is an orientation of the mobile electronic device; and
    the characteristic of torque feedback is further selected so as to counteract an angular velocity of the device.

12. A mobile electronic device, comprising:
    an enclosure;
    a display positioned in the enclosure and including a glass cover;
    a gyroscope in the enclosure and comprising a mass; and
    a control system operably connected to the gyroscope and adapted to execute instructions that cause the mobile electronic device to:
      detect an event;
      determine a characteristic of a gyroscopic torque to be transmitted to the mobile electronic device, wherein the characteristic of the gyroscopic torque is based on a characteristic of the event;
      alter a spatial orientation of the mobile electronic device by causing the gyroscope to generate the gyroscopic torque in accordance with the determined characteristic of the gyroscopic torque; and
      cause the gyroscope to generate the gyroscopic torque by:
        rotationally oscillating the mass about a first axis, comprising cycling between:
          rotating a mass less than a complete revolution in a first direction; and
          rotating the mass less than a complete revolution in a second direction opposite the first direction; and
        while rotationally oscillating the mass, tilting the mass about a second axis different than the first axis.

13. The mobile electronic device of claim 12 further comprising a motion sensor operably coupled to the control system, wherein detecting the event includes detecting, with the motion sensor, that the mobile electronic device is in free fall.

14. The mobile electronic device of claim 12 further comprising an orientation sensor operably coupled to the control system, wherein the control system is further adapted to execute instructions that cause the mobile electronic device to:
    determine, with the orientation sensor, an orientation of the mobile electronic device; and determine the characteristic of gyroscopic torque to be transmitted to the mobile electronic device based on the determined orientation of the mobile electronic device and a target orientation.

15. A gyroscope module for altering a spatial orientation of a mobile electronic device, comprising:
a gyroscope comprising:
a housing configured to be coupled to a mobile electronic device;
a mass within the housing and configured to rotationally oscillate about a first axis; and
an actuator configured to tilt the mass about a second axis;
a control system operably connected to the gyroscope, wherein the control system is adapted to execute instructions that cause the gyroscope module to:
receive, from the mobile electronic device, an indication of an event;
determine a characteristic of a gyroscopic torque to be transmitted to the mobile electronic device, wherein the characteristic of the gyroscopic torque is based on a characteristic of the event; and
alter a spatial orientation of the mobile electronic device by causing the gyroscope to generate the gyroscopic torque in accordance with the determined characteristic of the gyroscopic torque, wherein causing the gyroscope to generate the gyroscopic torque comprises:
causing the mass to be rotationally oscillated about the first axis, comprising:
causing the mass to rotate less than a complete revolution in a first direction; and
causing the mass to rotate less than a complete revolution in a second direction opposite the first direction; and
while the mass is rotationally oscillated about the first axis, causing the mass to be tilted about the second axis.

16. The mobile electronic device of claim 12, wherein the characteristic of the gyroscopic torque is one or more of a magnitude of the gyroscopic torque, a direction of the gyroscopic torque, and/or a duration of application of the gyroscopic torque.

17. The mobile electronic device of claim 12, wherein generating the gyroscopic torque with the gyroscope comprises generating torques in two directions.

18. The mobile electronic device of claim 12, wherein generating the gyroscopic torque with the gyroscope comprises generating torques in three directions.

19. The mobile electronic device of claim 12, wherein detecting the event includes:
determining that the mobile electronic device is in free fall;
determining a spatial condition of the mobile electronic device during the free fall; and
predicting a damaging impact based on the determined spatial condition of the mobile electronic device.

20. The mobile electronic device of claim 19, wherein the spatial condition is an orientation of the mobile electronic device.

21. The mobile electronic device of claim 12, wherein:
rotating the mass less than a complete revolution in the first direction comprises rotating the mass 10 degrees or less in the first direction from a center position; and
rotating the mass less than a complete revolution in the second direction comprises rotating the mass 10 degrees or less in the second direction from the center position.

* * * * *